No. 12,765. REISSUED MAR. 24, 1908.

R. B. BENJAMIN.

PLURAL LAMP SOCKET.

APPLICATION FILED FEB. 6, 1908.

Witnesses:

R. A. Perry

W. Perry Hahn

Inventor:

Reuben B. Benjamin

By Jones, Addington & Ames

Attys.

UNITED STATES PATENT OFFICE.

REUBEN B. BENJAMIN, OF CHICAGO, ILLINOIS, ASSIGNOR TO THE BENJAMIN ELECTRIC MANUFACTURING COMPANY, OF CHICAGO, ILLINOIS, A CORPORATION OF ILLINOIS.

PLURAL-LAMP SOCKET.

No. 12,765. Specification of Reissued Letters Patent. Reissued Mar. 24, 1908.

Original application filed May 20, 1898. Renewed August 10, 1901, Serial No. 71,635. Original No. 721,774, dated March 3, 1903, Application for reissue filed February 6, 1908. Serial No. 414,653.

*To all whom it may concern:*

Be it known that I, REUBEN B. BENJAMIN, a citizen of the United States, residing at Chicago, in the county of Cook and State of Illinois, have invented a certain new and useful Improvement in Plural-Lamp Sockets, of which the following is a full, clear, concise, and exact description, reference being had to the accompanying drawings, forming a part of this specification.

My invention relates to a plural-lamp socket, my object being to provide a compact and cheaply-constructed form of socket for a cluster of incandescent lamps.

I have illustrated my invention in the accompanying drawings, in which—

Figure 1:
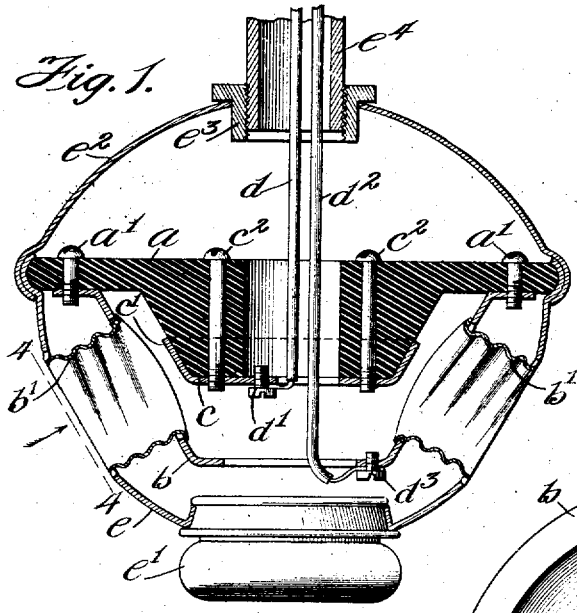
Figure 2:
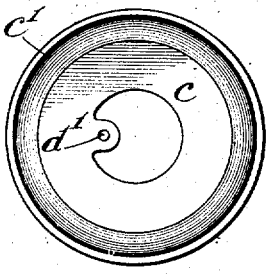
Figure 3:
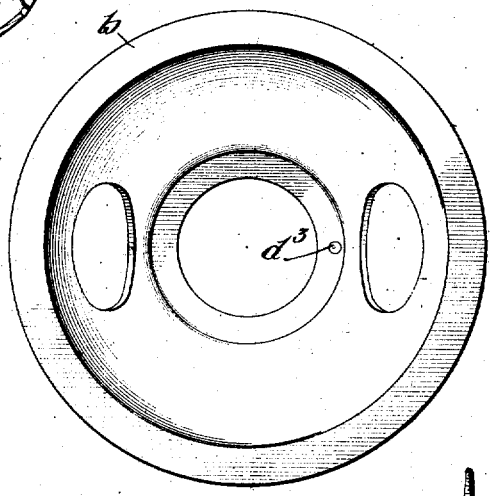
Figure 4:
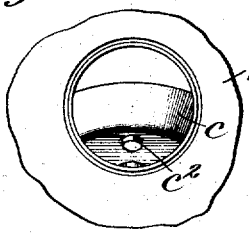
Figure 5:
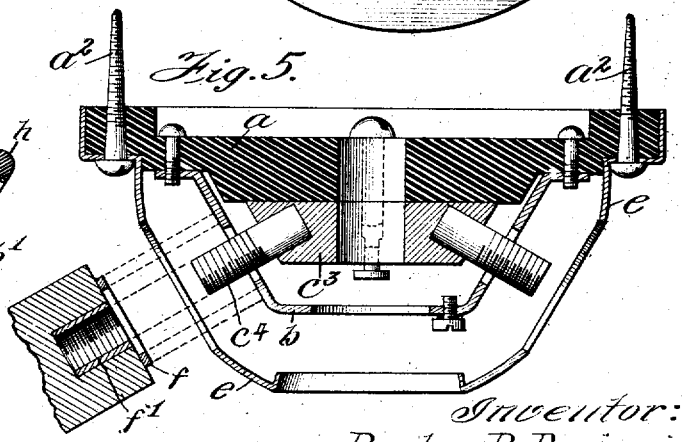
Figure 6:
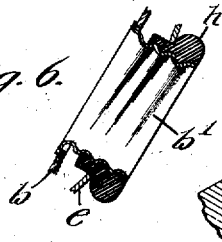

Figure 1 is a sectional view of a plural socket embodying my invention. Fig. 2 is a plan view of the contact adapted to be engaged by the central terminals of the lamps. Fig. 3 is a plan view of the bowl-shaped contact-plate which supports the contacts adapted to be engaged by the ring-terminals of the lamps. Fig. 4 is a view of one of the individual sockets. Fig. 5 is a sectional view of a modification wherein the socket is adapted to receive lamps having bases of the Thomson-Houston type, and Fig. 6 is a view of a further modification.

Like letters refer to like parts in the several figures.

Upon the under side of an insulating-base $a$ is supported a bowl-shaped contact-plate $b$, having oblique side walls and being secured at the upper edge to the insulating-base by means of screws $a'$ $a'$. Upon the oblique side walls are mounted the threaded shells $b'$ $b'$ to receive the lamp-bases. Within this bowl-shaped contact-plate and supported upon the insulating-base is a contact-plate $c$, which in the present instance has an upturned rim $c'$, which constitutes the contact adapted to be engaged by the central terminal of the lamp when the base thereof is screwed into the shell $b'$. The plate $c$ is secured upon the base $a$ by means of screws $c^2$ $c^2$. One of the conductors $d$ is connected with the screw $d'$, provided upon the plate $c$, and the other conductor $d^2$ is connected with a screw $d^3$, mounted upon the plate $b$, whereby plates $c$ and $b$ constitute the opposite terminals of the socket, and when the several lamps are screwed into position they are connected in parallel. A casing $e$ surrounds the lower portion of the socket, having openings to accommodate the shells $b'$ and having upon the lower end and centrally situated relatively to the individual sockets a removable cap $e'$, which may be removed when it is desired to gain access to the binding-screws $d'$ $d^3$. The upper portion of the socket is also inclosed within a metal shell $e^2$, supported in the present instance by a bushing $e^3$, secured to the pipe $e^4$.

In Fig. 5 I have illustrated a socket adapted for lamps having bases of the Thomson-Houston type. The contact-plate $b$ is similarly supported from the insulating-base $a$, which in the present instance is shown as the base of a wall-socket adapted to be secured to the wall by means of screws $a^2$ $a^2$. The ring-terminal $f$ of the lamp-base is adapted to engage the oblique base of the bowl-shaped contact-plate $b$, while the centrally-screw-threaded contact $f'$ of the lamp is adapted to screw upon the post $c^4$, a number of which are mounted upon a metal base $c^3$, screwed to the under side of the insulating-base $a$. A casing $e$ incloses the metal portions of the socket, as in the former instance.

In Fig. 6 I show how insulating bushings or rings $h$ may be applied to the shells $b'$ to insulate the casing $e$ therefrom to assist in holding the casing in place and to aline the apertures in the case with the threaded shells. As shown, these bushings or rings are preferably threaded to permit them to be screwed upon the shells. The bowl-shaped contact-plate in each of the forms illustrated herein forms an electrical conductor to convey current to the ring-terminals of the lamps, thus dispensing with wiring, and at the same time it forms an effective mechanical support without the provision of any additional supporting structure.

I am aware that clusters of sockets have heretofore been constructed by associating together a plurality of separate and individual lamp sockets, each having its own insulating base, lamp contacts and individual pair of binding posts, and connected to the electric circuit by means of spliced leading-in connections or individual lamp wires, and I disclaim such structures.

By the term "electrical connections," "conductors," "conducting parts or members," and similar expressions occurring in the claims, I mean the conducting parts or members of the organized structure by which the contacts for the lamps are interconnected in the desired circuit relation, and whereby suitable connection terminals may be provided for readily connecting the leading-in wires with the cluster.

Having thus described my invention, what I claim as new and desire to secure by Letters Patent, is:

1. In a plural-lamp socket, the combination with an insulating-base, of a metallic bowl-shaped contact-plate mounted thereon and having oblique side walls provided with a plurality of openings to accommodate the center lamp and socket terminals and carrying the contacts for the ring-terminals of the lamps, contacts for the end terminals of the lamps supported within said bowl-shaped contact-plate and placed opposite the openings therein, and means adapted to secure the lamps in operative relation with said contacts, substantially as described.

2. An electric-lamp cluster, comprising a plurality of metallic receivers for the lamps, a metallic truncated portion carrying the receivers and attached to the base, an electric connection with the receivers, an additional contact for each receiver and an electric connection with said contacts, as set forth.

3. An electric-light-lamp cluster, consisting of a non-conductor base, a metallic truncated lower portion attached to the base and having a plurality of lamp-receivers and suitable electric connections extending to said truncated portion, substantially as described.

4. In a plural-lamp socket, the combination with an insulating-base, and a metallic contact-plate mounted thereon, of a plurality of metallic threaded shells for the lamp-bases, supported thereon and in electrical contact therewith, and contacts for the central-lamp terminals arranged opposite the respective shells, substantially as described.

5. In a plural-lamp socket, the combination with a suitable base, of a plate mounted thereon having side walls provided with openings to accommodate the central lamp and socket terminals, a plurality of threaded shells mounted on said walls, and central terminals for the lamps, substantially as described.

6. In a plural-lamp socket, the combination with a suitable base, of a contact-plate mounted thereon having side walls provided with a plurality of openings to accommodate the central lamp and socket terminals and carrying the contacts for the ring-terminals of the lamps, upturned contact portions adapted to be engaged by the central lamp terminals, and means adapted to secure the lamp in operative relation with said contacts, substantially as described.

7. The combination with a suitable base, of a contact-plate of conducting material provided with a plurality of openings to accommodate the second contacts of the lamp-holding devices, lamp-holding devices and associated contacts, said contact-plate carrying one contact of each lamp-holding device, and the second contact thereof being suitably mounted.

8. The combination with a suitable base, of a contact-plate of conducting material having side walls provided with a plurality of openings to accommodate the second contacts of the lamp-holding devices, lamp-holding devices and associated contacts, the side walls of said contact-plate carrying one contact of each lamp-holding device, and the second contact thereof being suitably mounted.

9. A cluster-lamp socket comprising an insulating-base, a plurality of lamp-holding devices having contacts supported upon said base, conducting parts or members interconnecting said contacts in the desired circuit relation, suitable connection terminals for the leading-in wires, and a metallic cover or casing having openings for the passage of the lamp-bases and independent of said lamp-holding devices.

10. A cluster-lamp fixture comprising an insulating-base, a plurality of lamp-holding devices each having two contacts supported upon said base, and a metallic cover or casing having openings for the passage of the lamp-bases and independent of said lamp-holding devices.

11. A cluster-lamp socket comprising an insulating-base, a plurality of threaded shells supported by said base, suitable center contacts for said shells, conducting parts or members interconnecting said shells and contacts in the desired circuit relation, suitable connection terminals for the leading-in wires, and a separate cover or casing.

12. A cluster-lamp fixture comprising an insulating-base, lamp-holding devices and their contacts all mounted upon said insulating base, and a removable cover.

13. A cluster-lamp socket comprising an insulating-base, lamp-holding devices and associated contacts all mounted upon said insulating-base, conducting parts or members directly joining respectively the like contacts of said lamp-holding devices, suitable connection terminals for the leading-in wires, and a cover having an opening opposite each lamp-holding device, substantially as described.

14. A cluster-socket comprising a suitable base, lamp-holding devices and associated contacts arranged to hold the lamps in an oblique position relatively to the base, conducting parts or members interconnecting said contacts in the desired circuit relation, suitable connection terminals for the leading-in wires, and a cover having an opening opposite each lamp-holding device, substantially as described.

15. A cluster-lamp socket comprising an insulating-base, a number of lamp-holding sockets with their contacts directly mounted on the insulating-base, conducting parts or members common respectively to the like contacts of said sockets, connection terminals for the ready connection of the leading-in wires with said parts or members, and a cover having an opening opposite each lamp-holding device, substantially as described.

16. A cluster-lamp fixture comprising an insulating-base, a number of threaded shells and center contacts constituting the lamp-sockets mounted upon the insulating-base, and a cover having an opening opposite each socket, substantially as described.

17. A cluster-lamp socket comprising an insulating-base, a number of threaded shells and center contacts constituting the lamp-sockets mounted upon the insulating-base, conducting parts or members interconnecting said shells and contacts in the desired circuit relation, suitable connection terminals for the leading-in wires, and a cover-having an opening opposite each socket, substantially as described.

18. A cluster-socket comprising a suitable base, lamp-holding devices and associated contacts arranged to hold the lamps in an oblique position relatively to the base, and an inclosing cover or casing.

19. A cluster-lamp socket comprising an insulating-base, a removable cover and a number of lamp-holding sockets with their contacts directly mounted on the insulating-base, conducting parts or members directly joining respectively the like contacts of said lamp holding sockets, and suitable connection terminals for the leading-in wires.

20. A cluster-lamp fixture comprising an insulating-base, and a removable cover, a number of threaded shells and center contacts constituting the lamp-sockets mounted directly upon the insulating-base.

21. A cluster-lamp fixture comprising an insulating base, lamp-holding devices and their contacts all mounted upon said insulating-base, a removable cover, electrical conductors connecting said contacts and carried upon said base, and means, as binding-posts, supported upon said base for the connection of the leading-in wires.

22. A cluster-lamp fixture comprising an insulating-base, lamp-holding devices and their contacts, all mounted upon said insulating-base, electrical conductors connecting said contacts and carried upon said base, means, as binding-posts, for the connection of the leading-in wires, and a removable cover permitting access to said binding-posts or similar means.

23. In a cluster socket, an insulating-base, lamp-holding devices and associated contacts, a casing having an opening opposite each lamp-holding device, and means for maintaining the openings in said casing in alinement with said respective lamp-holding devices.

24. A lamp fixture comprising a suitable base, a plurality of lamp-holding devices and associated contacts associated with said base, a finishing shell or cover having an opening opposite each of said lamp-holding devices for the passage of the lamp-bases, and a removable cap carried upon said cover.

25. In a cluster socket, the combination with a suitable base, a contact-plate attached at its rim to said base, and carrying a plurality of openings to accommodate the second contacts of the lamp-holding devices, lamp-holding devices and associated contacts, said contact-plate carrying one contact of each lamp-holding device and the second contact thereof being suitably supported.

26. In a lamp socket, an insulating-base, a plurality of threaded lamp-shells occupying oblique positions relatively to the axis of said base, and metallic supporting parts for said shells secured to said base by screws or bolts passing axially into or through said base.

27. In a plural-lamp socket, the combination with a suitable base, of a plurality of lamp-receiving shells suitably supported thereon in oblique positions, each of said shells being unobstructed throughout its length to permit the lamp-base to pass completely therethrough, and center contacts for the respective shells situated beyond the inner ends thereof, whereby the lamp-holding devices may be assembled in compact form, substantially as described.

In testimony whereof I have signed my name to this specification, in the presence of two subscribing witnesses.

REUBEN B. BENJAMIN.

Witnesses:

W. PERRY HOLM,

ROBERT LEWIS AMES.